United States Patent Office 3,702,874
Patented Nov. 14, 1972

3,702,874
HYDROCARBON CONVERSION PROCESS
John H. Estes, Wappingers Falls, Stanley Kravitz, Wiccopee, and Robert M. Suggitt, Wappingers Falls, N.Y., assignors to Texaco Inc., New York, N.Y.
No Drawing. Filed Dec. 7, 1970, Ser. No. 95,949
Int. Cl. C07c 9/00
U.S. Cl. 208—112
10 Claims

ABSTRACT OF THE DISCLOSURE

Paraffin hydrocarbons containing at least seven carbon atoms are subjected to hydrocracking and isomerization under controlled temperature conditions by contacting the hydrocarbon with hydrogen, carbon monoxide and a chloride activated platinum-alumina catalyst.

BACKGROUND OF THE INVENTION

This invention relates to a process for the conversion of paraffin hydrocarbons having at least seven carbon atoms to more valuable products. In particular this invention relates to a process for catalytically converting paraffin hydrocarbons under controlled temperature conditions to highly branched hydrocarbon products.

The contacting of paraffin hydrocarbons having at least seven carbon atoms with hydrogen and a chloride activated platinized alumina catalyst results in a substantial amount of cracking to highly branched saturated lower boiling hydrocarbons accompanied by isomerization. In the case of hydrocarbons boiling higher than heptanes, isomerization is accompanied by almost complete conversion to highly branched saturated lower boiling products. During the course of conversion employing chloride activated platinized alumina catalysts the conversion of $C_7$–$C_{10}$ paraffins initially proceeds by a substantial amount of cracking and hydrogenation to highly branched hydrocarbons. Within a short period of time, however, the hydrocracking reaction being highly exothermic causes a rapid rise in reaction temperature which in turn accelerates cracking and ultimately uncontrollable temperatures, reactions and rapid catalyst deactivation through the deposition of coke on the catalyst. From U.S. 3,242,229 the art is provided with one means for controlling the exothermic nature of the reaction. This is accomplished by introducing an isomerizable hydrocarbon containing at most six carbon atoms into the feedstock containing another hydrocarbon possessing at least seven carbon atoms and in this manner the exothermic heat of hydrocracking is absorbed and the reaction and temperature is controlled leading to larger yields of isomeric products. While such a process is beneficial in controlling temperature conditions, the means employed necessarily requires the introduction of substantial amounts of diluent which substantially affects the ultimately desired product distribution. Where substantially undiluted feedstocks composed of paraffin hydrocarbons containing at least seven carbon atoms are sought to be processed, no means have heretofore been available providing control over temperature, reaction and catalyst life.

SUMMARY OF THE INVENTION

It has now been discovered that control over temperature and reaction can be provided to a hydrocarbon conversion process which comprises contacting hydrogen, a paraffin hydrocarbon containing at least seven carbon atoms and a catalyst consisting essentially of platinum, alumina and 3.0 to 15.0 wt. percent chlorine at a temperature from about 200 to 400° F. by introducing small amounts of carbon monoxide during the period of reaction. The beneficial effects provided to the reaction by carbon monoxide addition was unexpected inasmuch as carbon monoxide has long been considered a strong general poison towards platinum metal catalysts. Notwithstanding the known deleterious effects of carbon monoxide, the introduction of small amounts in the course of converting the paraffin hydrocarbon has provided a means for controlling reaction temperature and selectivity towards desired products while simultaneously providing the catalyst with extended life and on stream time.

In accordance with this invention the conversion is undertaken at conditions including temperatures from about 200 to 400° F., preferably 250 to 350° F., liquid hourly space velocities of from about 0.1 to 5.0, preferably 0.5 to 2.0, and hydrogen to hydrocarbon mole ratios in the range of about 0.10:1 to 5.0:1, preferably 1:1 to 3:1. The catalyst employed in the process consists essentially of platinum, alumina and 3.0 to 15.0 weight percent chlorine, the platinum customarily present in an amount of from about 0.1 to 10.0 weight percent and preferably 0.5 to 2.0 weight percent. The catalyst is conveniently prepared by compositing platinum with alumina and activating the composite by contacting with an organic chloride activating agent or combination of agents as described in applications Ser. No. 419,755, filed Dec. 21, 1964, Ser. No. 810,031, filed Mar. 24, 1969 and Ser. No. 812,914, filed Apr. 2, 1969, all assigned to the assignee hereof. According to these disclosures, the catalyst is prepared by chloriding a composite of platinum and alumina by treating with an organic chloride activating agent, that is, a chloroalkane or an acid chloride or other chloriding systems under conditions effective to react at least a portion of said activating agent with at least one component of said platinum-alumina composite such that the composite is catalytically activated and provided with a chloride content of about 3.0 to 15.0 weight percent.

As provided above carbon monoxide introduction during the course of conversion provides a means for controlling processing temperatures while concomitantly directing catalyst selectivity to desired products, maintaining catalyst activity and permitting the catalyst to remain substantially free of deleterious coke deposition. A plurality of hydrocarbon feedstocks may be permitted to undergo varying degrees of conversion under the conditions recited above including hydrocracking and isomerization. Illustratively, paraffins such as normal heptanes can be selectively hydrocracked to propane and isobutane or isomerized to isoheptanes. Normal octane can be selectively hydrocracked to mixtures of propane, isobutane and pentanes. Isooctanes can be selectively hydrocracked to predominantly isobutane. Nonane can be hydrocracked to isobutane, pentane and isopentane and hexanes. Decane can be hydrocracked to isobutane and hexanes. In a similar manner paraffin hydrocarbons having greater than 10 carbon atoms can be hydrocracked and isomerized to propane. isobutane, butane, isopentane and hexanes.

Extremely low concentrations of carbon monoxide introduced in the course of converting the hydrocarbon have been found to perform the function of controlling temperature, selectivity, activity and maintaining the catalyst relatively free of coke. The amount of carbon monoxide beneficially employed and introduced in the course of hydrocarbon conversion varies from about $1 \times 10^{-7}$ to $5 \times 10^{-4}$ gram mole of carbon monoxide per hour per gram of said catalyst and preferably from $1 \times 10^{-6}$ to $5 \times 10^{-5}$ gram mole of carbon monoxide per hour per gram of said catalyst. In selecting the amount of carbon monoxide introduced to particular reactions we have found that the rate of carbon monoxide introduction is dependent upon the temperature of the reaction such that the higher amounts of carbon monoxide are required to control higher temperature reactions while the lower amounts set out above perform the same function at lower temperatures. That is, amounts such as $1 \times 10^{-7}$ to $1 \times 10^{-5}$ gram mole of carbon monoxide per hour per gram of catalyst are sufficient where the conversion reaction is conducted at temperatures of about 200° F. whereas higher amounts of carbon monoxide such as $1 \times 10^{-5}$ to $5 \times 10^{-4}$ are needed when conversion temperatures are about 400° F. Likewise, carbon monoxide introduction and its effect upon the process is responsive to the percentage chlorine present on the catalyst. A catalyst containing lower amounts of chlorine such as 3.0 weight percent requires less carbon monoxide to control the reaction whereas chlorine contents of about 15 weight percent require the higher rates of carbon monoxide introduction. A final factor is selecting the rate of carbon monoxide introduction resides in the carbon number of the feedstock, that is, less carbon monoxide is required when the feedstock consists of lower molecular weight paraffins such as heptane whereas increased amounts of carbon monoxide are called for as the molecular weight of the hydrocarbon feed increases as, for example, where the feedstock is a paraffin wax containing 27 carbon atoms. Mixtures of $C_7$ and higher hydrocarbons up to $C_{27}$ or other hydrocarbon mixtures containing $C_7$ to $C_{10}$ paraffins such as Udex raffinates and heavy straight run fractions having initial boiling points of about 200° F. and end points of about 400° F. can be selectively hydrocracked and isomerized in accordance with this invention. Middle distillates containing $C_{11}$ to $C_{18}$ paraffins having initial boiling points of about 400° F. and end points of about 600° F. can be selectively hydrocracked to provide normal and iso $C_5$–$C_6$ gasoline blending materials. A preferred process involves selective hydrocracking of $C_7$ to $C_{10}$ paraffins by employing conversion conditions of 275 to 350° F., 100 to 300 p.s.i.g. and hydrogen rates of about 4000 cubic feet per barrel of charge.

The end products from the conversion reaction can be easily adjusted by varying the introduction rate of the carbon monoxide to the process, such that higher levels of carbon monoxide introduction favor isomerization whereas lower levels favor hydrocracking. Moreover, hydrogen pressures of from 100 to 1000 p.s.i.g. may be employed, but pressures have been found to have little effect on the process. One convenient means of introducing carbon monoxide to the reaction zone has been to add carbon monoxide to the hydrogen stream prior to hydrogen intorduction into the reaction chamber. Carbon monoxide introduction can be on a continuous basis or, alternatively, carbon monoxide may be pulsed or intermittently introduced to the reaction such that the rate of carbon monoxide introduction is within $1 \times 10^{-7}$ to $5 \times^{-4}$ gram mole of carbon monoxide per hour per gram of said catalyst.

In order to more fully illustrate the nature of our invention and manner of practicing the same the following examples are presented. In these examples the best mode contemplated by us for carrying out our invention is set forth.

EXAMPLE I 675 grams of commercially available 0.6 weight percent platinum on eta alumina in the form of $\frac{1}{16}''$ extrusions were dried at 1050° F. and subsequently contacted with 92.5 grams of carbon tetrachloride at 500° F. The resulting chlorided platinum-alumina catalyst was stabilized by heating to 1000° F. for two hours and was found to contain 0.55 weight percent platinum and 6.9 weight percent chlorine.

The catalyst was evaluated for n-hexane isomerization at standard conditions of 275° F., 300 p.s.i.g., 1 LHSV and 3.2:1 hydrogen to hydrocarbon mole ratio was found to be highly active in that it converted 87 percent of the charge to hexane isomers.

Another sample of catalyst identified above was evaluated for n-heptane isomerization at 275° F., 300 p.s.i.g., 1 LHSV and 3.2:1 hydrogen to hydrocarbon mole ratio. A highly exothermic reaction was observed and the reaction temperature could not be controlled. The evaluation was repeated except no heat was applied. Within a short period of time, a temperature of 390° F. was recorded and the n-heptane charge was cracked primarily to butane and propane. The catalyst showed noticeable deactivation within 20 hours.

Other samples of catalyst were evaluated respectively for n-hexane and n-heptane isomerization at conditions of 275° F., 300 p.s.i.g., 1 LHSV and 3.2:1 hydrogen to hydrocarbon mole ratio in the addiitonal presence of $2.3 \times 10^{-4}$ gram mole of carbon monoxide per hour per gram of said catalyst. In each instance the charge stock was neither converted nor cracked.

EXAMPLE II

The catalyst of Example I was employed to isomerize n-heptane at 275° F., 300 p.s.i.g., 1 LHSV and 4.8:1 hydrogen to hydrocarbon mole ratio. Carbon monoxide was introduced to the reactor at the average rate of about $2.0 \times 10^{-5}$ gram mole per hour per gram of catalyst for one hour at four hour intervals with the results summarized in Table I below:

TABLE I

| Time on stream, hours | 9-12 | 13-16 | 17-20 | 21-24 | 25-28 | 29-32 | 33-36 | 37-4 |
|---|---|---|---|---|---|---|---|---|
| CO introduction | Yes | Yes | Yes | Yes | No | No | No | No |
| Liquid product analysis: | | | | | | | | |
| Iso-$C_4$ | 1.2 | 0.4 | 1.1 | 1.5 | 0.8 | 0.6 | (¹) | (¹) |
| n-$C_4$ | 6.1 | 4.2 | 5.3 | 5.5 | 8.1 | 7.1 | 3.1 | 0.1 |
| Iso-$C_5$ | 0.3 | 0.4 | 0.4 | 0.4 | 0.3 | 0.4 | 0.4 | 0.1 |
| n $C_5$ | (¹) | (¹) | (¹) | (¹) | (¹) | 0.1 | 0.1 | (¹) |
| Iso-$C_6$ | 2.4 | 2.4 | 1.4 | 1.1 | 4.5 | 4.4 | 4.1 | 2.6 |
| n-$C_6$ | 3.0 | 1.8 | 1.5 | 1.5 | 3.5 | 2.2 | 1.2 | 0.8 |
| Iso-C | 30.2 | 36.4 | 34.2 | 38.0 | 68.3 | 73.2 | 81.3 | 84.9 |
| n-C | 56.5 | 54.3 | 55.9 | 51.9 | 14.3 | 11.9 | 9.6 | 11.5 |
| Weight percent yield as liquid | 59.0 | 58.0 | 72.0 | 94.0 | 37.6 | 16.8 | 14.6 | 15.0 |
| Weight percent yield of isomers in liquid product | 33.4 | 39.6 | 37.1 | 41.0 | 73.9 | 78.6 | 85.8 | 87.6 |
| Total yield of isomers | 19.7 | 23.0 | 26.7 | 38.5 | 27.8 | 13.2 | 12.5 | 13.1 |

¹ Trace.

The addition of carbon monoxide results in a continual increase in the total liquid isomer yield, in this case a level of 38.5% was reached. The removal of moderator shows an immediate decline in liquid yield, the level of product in the propane and lighter yield increasing to about 85%, 16 hours after carbon monoxide has been removed.

Reducing the concentration of carbon monoxide to about $4.9 \times 10^{-6}$ gram mole per hour per gram of catalyst resulted in 99 weight percent conversion of n-heptane by hydrocracking to 49.1 weight percent propane, 48.0 weight percent isobutane, 1.4 weight percent n-butane, 1.4 weight percent isopentane and 0.1 weight percent n-pentane on a hydrogen free basis. The temperature of the reaction was easily maintained at 275° F.

EXAMPLE III

The catalyst of Example I was employed to hydrocrack isooctane at 275° F., 300 p.s.i.g., 1 LHSV and 4.8:1 hydrogen to hydrocarbon mole ratio. Carbon monoxide was introduced to the reaction in admixture with the hydrogen stream at the rate of $4.9 \times 10^{-6}$ gram mole of carbon monoxide per hour per gram of catalyst. Over a six hour period the isooctane feed was converted to 1.3 weight percent propane, 96.4 weight percent isobutane, 2.2 weight percent n-butane and 0.2 weight percent isopentane. The temperature of the reaction was easily maintained at 275° F.

EXAMPLE IV

Seventy-seven grams of a catalyst composed of 0.6 weight percent platinum and 4.5 weight percent chlorine on alumina was employed to isomerize-n-octane in the presence of varying amounts of carbon monoxide expressed in gram mole per hour per gram of catalyst with the results summarized in Table II below.

TABLE II

| Run number | 1 | 2 |
|---|---|---|
| Temperature, °F | 275 | 275 |
| $H_2$ pressure, p.s.i.g | 300 | 300 |
| $H_2$ rate, ft.³/hr | 2.0 | 1.5 |
| CO rate | | $9.9 \times 10^{-6}$ |
| LHSV | 1.0 | 1.0 |
| Liquid charge, gms | 292 | 265 |
| Liquid recovery, gms | 45 | 212 |
| Product analysis, wt. percent: | | |
| $C_3$ | 9.7 | 2.3 |
| $i\text{-}C_4$ | 57.0 | 25.7 |
| $n\text{-}C_4$ | 4.8 | 2.6 |
| $i\text{-}C_5$ | 3.6 | 3.5 |
| $n\text{-}C_5$ | 0.4 | Trace |
| $i\text{-}C_6$ | 12.2 | 0.2 |
| $n\text{-}C_6$ | 2.3 | Trace |
| $i\text{-}C_7$ | 0.6 | Trace |
| $n\text{-}C_7$ | Trace | Trace |
| $i\text{-}C_8$ | 7.6 | 52.1 |
| $n\text{-}C_8$ | 0.1 | 25.6 |
| Heavier | 1.7 | |

From Table II, it is seen that carbon monoxide provided a highly selective process for converting n-octane to isooctane reaching a level of 52.1 weight percent.

EXAMPLE V

The catalyst of Example IV, 77 grams, was employed to selectively hydrocrack n-octane at 275° F., 300 p.s.i.g., 1 LHSV and 4.8:1 hydrogen to hydrocarbon mole ratio. Carbon monoxide was introduced to the reaction in admixture with the hydrogen stream at the rate of $3.2 \times 10^{-6}$ gram mole of carbon monoxide per hour per gram of catalyst for a period of two hours. Over a four hour period the temperature of conversion was easily maintained at 275° F. and the n-octane feed was converted to 7.6 weight percent propane, 77.0 weight percent isobutane, 7.8 weight percent n-butane, 7.4 weight percent isopentane and 0.3 weight percent n-pentane.

We claim:
1. A process for hydrocracking and isomerizing paraffin hydrocarbons which comprises contacting hydrogen, carbon monoxide, a paraffin hydrocarbon containing at least 7 carbon atoms and a catalyst consisting essentially of platinum, alumina and 3.0 to 15.0 weight percent chlorine at a temperature of from about 200 to 400° F., said carbon monoxide introduced at the rate of from about $1 \times 10^{-7}$ to $5 \times 10^{-4}$ gram mole of carbon monoxide per hour per gram of said catalyst.

2. A process according to claim 1 wherein said carbon monoxide is introduced at the rate of from about $1 \times 10^{-6}$ to $5 \times 10^{-5}$ gram mole per hour per gram of catalyst.

3. A process according to claim 1 wherein said temperature is from 250 to 350° F.

4. A process according to claim 1 wherein said paraffin hydrocarbon has from 7 to 27 carbon atoms.

5. A process according to claim 1 wherein said paraffin hydrocarbon has from 7 to 10 carbon atoms.

6. A process according to claim 1 wherein said hydrocarbon is n-heptane.

7. A process according to claim 1 wherein said hydrocarbon is n-octane.

8. A process according to claim 1 wherein said hydrocarbon is isooctane.

9. A process according to claim 1 wherein said contacting includes a liquid hourly space velocity of 0.1 to 5.0.

10. A process according to claim 1 wherein said contacting includes a hydrogen to hydrocarbon mole ratio of about 0.10:1 to 5.0:1.

References Cited

UNITED STATES PATENTS

| 1,403,194 | 1/1922 | Ramage | 208—112 |
| 3,630,885 | 12/1971 | Egan | 208—112 |
| 3,242,229 | 3/1966 | Estes | 260—683.68 |
| 3,375,191 | 3/1968 | Pfefferle | 208—112 |

DELBERT E. GANTZ, Primary Examiner

J. M. NELSON, Assistant Examiner

U.S. Cl. X.R.

208—139; 260—683.68